United States Patent [19]

Stephens

[11] 3,899,444

[45] Aug. 12, 1975

[54] EXHAUST GAS CATALYST SUPPORT

[75] Inventor: Ruth E. Stephens, Royal Oak, Mich.

[73] Assignee: Ethyl Corporation, Richmond, Va.

[22] Filed: Dec. 22, 1972

[21] Appl. No.: 317,831

Related U.S. Application Data

[63] Continuation-in-part of Ser. No. 224,240, Feb. 7, 1972.

[52] U.S. Cl............. 252/455 R; 252/462; 252/463; 252/471; 423/213.5
[51] Int. Cl...... B01j 11/40; B01j 11/06; B01j 11/32
[58] Field of Search........ 252/462, 463, 455 R, 457; 423/213.5

[56] References Cited
UNITED STATES PATENTS

| | | | |
|---|---|---|---|
| 3,284,370 | 11/1966 | Clifford et al. | 252/462 |
| 3,554,929 | 1/1971 | Aarons | 252/462 |
| 3,741,725 | 6/1973 | Graham | 423/213.5 |
| 3,781,406 | 12/1973 | Roth et al. | 252/462 X |

Primary Examiner—Carl F. Dees
Attorney, Agent, or Firm—Donald L. Johnson; Robert A. Linn; Joseph D. Odenweller

[57] ABSTRACT

A thermally stable and attrition resistant catalyst support consisting essentially of an alumina coating on an inert substrate. The alumina coating has a rare earth metal oxide substantially uniformly distributed throughout. Catalyst compositions utilizing this support, processes for preparing both support and catalyst, and a method of treating internal combustion engine exhaust gases and preventing crystallization of alumina are disclosed. Catalysts consisting essentially of an alumina matrix containing rare earth metal oxide and a catalytic metal oxide are also disclosed. The atom ratio of rare earth metal to aluminum in the support is 1:5.7–25. The atom ratio of catalytic metal to rare earth metal to aluminum in the catalysts is 1:0.8–1.4:8–20.

42 Claims, No Drawings

EXHAUST GAS CATALYST SUPPORT

This application is a continuation-in-part of application Ser. No. 224,240, filed Feb. 7, 1972.

BACKGROUND OF THE INVENTION

This invention relates to an improved method for preparing stabilized alumina catalyst supports. More particularly, it relates to the use of novel and inexpensive materials to prepare a stabilized activated alumina catalyst support which when used with suitable metal-containing catalysts has been found to be especially effective in the oxidation of automotive exhaust gases. Even more specifically, this invention relates to the use of alumina to which is added a rare earth metal compound thereby forming an activated, stabilized catalyst support when calcined at elevated temperatures. Rare earth metals are also known as Lanthanide Series metals and include metals having an atomic number from 57 through 71, but more generally from 57 through 63.

It has been well known that alumina is an excellent support for catalysts in a wide range of chamical reactions. In fact, in many cases alumina has been shown to have catalytic activity of its own and will therefore often enchance the activity of the catalyst it is supporting. It is further known that the activity of an alumina supported catalyst will be dependent on the surface area. It is advantageous to retain a maximum surface area when the alumina is calcined. At very high temperatures phase changes occur which convert the desirable eta or gamma phases into the less desirable theta or alpha phases, resulting in a great drop in the surface area.

According to U.S. Pat. No. 3,291,564, it is known to use potassium, cesium, or barium compounds to stabilize the alumina support and prevent loss of surface area and phase changes at high temperature.

According to British Pat. No. 1,231,276, potassium, calcium, and particularly barium, stabilize alumina, but only when the active catalyst is impregnated in an intermediate zone between the surface and the carrier core.

Catalysts consisting essentially of an alumina support containing rare earth metal oxides are disclosed in U.S. Pat. Nos. 3,483,138 and 3,545,917. These catalysts differ from the presently claimed catalyst supports in that the present supports have the alumina-rare earth metal oxide composition as a coating on an inert substrate or core. Also, the present support compositions have a defined atom ratio of rare earth metal to aluminum in the coating.

Laminar catalysts having an alumina core with a first layer of Lanthanide Series metal oxide and an outer layer of copper oxide are disclosed in U.S. Pat. No. 3,226,340. These catalysts differ from the presently-claimed catalysts in that the rare earth metal oxide and copper oxide are disclosed to be in discrete lamina and, hence, do not have an alumina matrix containing a catalytic metal and a rare earth metal.

Other patents relating to rare earth metal catalysts are U.S. Pat. Nos. 3,453,333; 2,152,908; 2,148,129; 2,129,733; 3,395,004; 3,284,370; 3,153,635; and 2,945,057.

The extremely severe conditions which prevail in the catalytic oxidation of carbon monoxide and hydrocarbons contained in the exhaust gases from internal combustion engines set unusually severe criteria for such catalysts, and this makes the selection of an effective catalyst extremely difficult. It is generally agreed that an effective catalyst should exhibit the following properties:

a. Catalyst should be effective at a relatively low temperature so that it will function soon after the engine has started, i.e., it must have a short warm-up period or a low activation temperature.

b. It should be highly efficient in oxidizing exhaust hydrocarbons and carbon monoxide.

c. It should have a long life, i.e.,
  1. It should not be easily poisoned.
  2. It should withstand at least 800°C. likely to develop during operation.
  3. It should not be abraded by the frequent shaking and occasional shocks characteristic of a pulsating exhaust gas stream.

Extensive research in this field has revealed that many catalysts will effectively oxidize the carbon monoxide and hydrocarbons contained in the exhaust gas from internal combustion engines. However, these catalysts have uniformly failed to be economically feasible in automotive catalytic converters due to their short life.

A primary reason for short catalyst life is the transformation of the alumina support from an amorphous or lower crystalline state (e.g., gamma, eta) to a highly crystalline state by either thermal or chemical means. In the more crystalline state, the catalyst is subject to fracture along the crystal's grain boundary, resulting in powdering, dusting, and eventually loss of catalyst. The formation of more crystalline material can be caused by phase transformation of the amorphous or transitional alumina to crystalline $\alpha$-alumina through action of heat over a period of time. Further, the interaction of alumina with catalyst metals forming metal aluminates also results in crystalline structures. In fact, many of the more active oxidation catalysts, particularly copper, not only interact with alumina to form aluminates but also promote formation of highly crystalline alumina phases. After formation of such crystalline structures, thermal and mechanical shock loss of catalyst by attrition and hence shortened life.

Thus, it is an object of this invention to provide a catalyst support which is thermally stable and attrition resistant. A further object is to provide a thermally stable and attrition resistant catalyst composition suitable for use in the exhaust gas of an internal combustion engine. A still further object of this invention is to provide a process for producing a thermally stable and attrition resistant catalyst support and catalyst. Another object of this invention is to provide a method of lowering the noxious constituents of engine exhaust gas such as carbon monoxide, hydrocarbons and nitrogen oxides contained in internal combustion engine exhaust gases using the thermally stable and attrition resistant support and catalyst composition provided. Another object is to provide a method of preventing crystallization of alumina at high temperature.

SUMMARY OF THE INVENTION

The above and other objects are accomplished by providing a catalyst support composition consisting essentially of an inert substrate or core coated with an alumina containing from about 1 to about 45 weight percent based on said alumina of a rare earth metal oxide uniformly distributed throughout said alumina coating. In the preferred embodiments to be described later the atom ratio of rare earth metal to aluminum in said alumina coating is 1 to about 5.7–25. Preferred rare earth metal oxides are lanthanum oxide, neodymium oxide, and praseodymium oxide and mixtures thereof.

In a further aspect of this invention there is provided a method of retarding change in the crystalline phase in alumina on heating to elevated temperatures, for example, about 900°C., said method comprising incorporating uniformly throughout said alumina a rare earth metal oxide in an amount of from about 1 to about 45 weight per cent based on said alumina and, more preferably, an amount that provides an atom ratio of rare earth metal to aluminum of 1 to about 5.7–25.

In a still further aspect, this invention provides a catalyst suitable for use in the exhaust gas of an internal combustion engine, said catalyst consisting essentially of an alumina matrix containing a catalytic metal and a rare earth metal oxide. The atom ratio of catalytic metal to rare earth metal to aluminum in said matrix is 1 to 0.8–1.4 to 8–20. The alumina matrix may comprise the entire catalyst or may be applied as a coating on an inert substrate or carrier such as another alumina. Preferred catalytic metals are copper oxide, platinum, palladium, vanadium oxide, chromium oxide, manganese oxide, iron oxide, nickel oxide, cobalt oxide, and various combinations of these with each other and additional materials.

A still further aspect of the invention is a process for preparing a thermally stable and attrition resistant catalyst support, said process comprising
a. forming an aqueous solution of a water-soluble, decomposable salt of a rare earth metal and a water-soluble aluminum salt;
b. evaporating the free water from said solution;
c. heating the resultant mixture of aluminum salt and rare earth metal salt whereby a uniform mixture of the salts if first formed and subsequently decomposed to their oxides; and
d. cooling said mixture whereby a solid thermally stable and attrition resistant support material is produced.

For example, an active supported copper-containing catalyst can be prepared by a process comprising
a. forming an aqueous salt solution of water-soluble, decomposable aluminum, lanthanum, and copper salts;
b. evaporating the free water from said solution whereby a solid uniform mixture of said salts is produced;
c. heating said mixture at a temperature of from about 400° to about 750°C. to decompose said salts to their oxides; and
d. cooling the oxide mixture whereby a copper oxide catalyst composition in an alumina matrix having the lanthanum oxide uniformly dispersed throughout said matrix is produced.

The catalyst of this invention is useful as an automotive exhaust gas catalyst. Hence, the invention provides a method of lowering the noxious constituents in internal combustion engine exhaust gases by contacting them at elevated temperatures with the catalysts of this invention.

DESCRIPTION OF THE PREFERRED EMBODIMENTS

One preferred embodiment of this invention is a thermally stable and attrition resistant catalyst support composition consisting essentially of an inert substrate coated with an alumina selected from amorphous and transitional alumina, said alumina coating containing from about 1 to about 45 weight per cent based on said alumina coating of a rare earth metal oxide uniformly distributed throughout said alumina coating. More preferably, the rare earth metal oxide is present in an amount to provide an atom ratio of rare earth metal to aluminum of 1 to 5.7–25 in said coating. A more preferred range is 1 to 8–20.

The alumina coating can be either amorphous or transitional alumina which are well known and commercially produced in various forms. Alumina is made in amorphous, transitional, and refractory forms. The transitional aluminas are meta stable forms which are produced by heating alpha- or beta-alumina trihydrates or alpha-alumina monohydrate forming the various transitional aluminas such as gamma, delta, eta, theta, kappa, chi, and rho, depending both on the temperature and time of heating. Usually a mixture of these transitional aluminas is formed. On prolonged heating, particularly at very high temperatures such as 1,150°C., the transitional aluminas are converted to "alpha-alumina" which is a stable refractory type alumina not applicable for use in the alumina coating but which can be used as the inert substrate. In addition to the refractory and transitional forms described above, there is a truly amorphous alumina which is characterized by having no definite X-ray diffraction pattern. This amorphous material is usually present along with the transitional aluminas. The highly crystalline alpha-aluminum formed on heating to high temperatures is not suitable because it has lower surface area and degrades into a powder of microscopic crystallites. It has been found that crystalline phase changes in amorphous alumina (e.g., to alpha-alumina) and of the transitional aluminas to more highly crystalline phases can be retarded by stabilization according to this invention. In other words, the present invention tends to stabilize an alumina support in its original phase whether it be amorphous or transitional. It is believed that crystalline phase changes which occur during prolonged exposure to elevated temperatures such as occur in treating exhaust gas are what causes most catalyst support material to crumble and be lost from the catalyst bed or to compact causing excessive back pressure. This degradation is promoted by the catalytic metal oxides contained in the alumina.

The amorphous or transitional alumina coating is prepared by any convenient method known in the prior art, such as by decomposing a salt of aluminum; for example, the nitrate, sulfate, oxalate, acetate, and the like. Commercially, large scale preparation of alumina is carried out as a by-product of the Fickes-Sherwin modification of the Bayer process for the manufacture of metallic aluminum. This process includes precipitating aluminum hydroxide from an alkali aluminate solution. The alumina gel is mixed with or co-precipitated with a rare earth metal oxide or compound thermally decomposable to an oxide to give the required atom ratio and the mixture applied to an inert substrate by known methods. The coated substrate is then calcined at 300°–800°C. In addition, the support of this invention can be produced by a process involving co-precipitation of the alumina and stabilizing rare earth metal oxide, as will be discussed more fully hereinafter.

The advantageous thermal stabilization and attrition resistant properties are imparted to the above amorphous and transitional alumina coating when a rare earth metal compound is uniformly distributed throughout said alumina coating as opposed to the mere surface treatment of alumina by impregnation with an aqueous solution of a Lanthanide Series metal compound. The rare earth metal is present in the alumina coating support as an oxide. Rare earth metals are lanthanum, cerium, praseodymium, neodymium, promethium, samarium, gadolinium, terbium, dysprosium, holmium, erbium, thulium, ytterbium, and lutetium. Mixtures of all or part of these, available commercially as their salts, may also be conveniently employed. The most common and most practical, hence the preferred, rare earth metals are lanthanum, praseodymium, and neodymium. The rare earth metals will be present in the alumina coating of the finally prepared support alone or a catalyst composition made from it in the form of an oxide. Accordingly, the preferred stabilizing agent is preferably lanthanum oxide, praseodymium oxide, or neodymium oxide. However, the usual starting material is a salt of a rare earth metal, usually a water-soluble salt, decomposable to an oxide, of which the nitrate, sulfate, and acetate are preferred.

The rare earth metal oxide can be present in an amount of from about 1 to about 45 percent by weight based on the weight of the alumina coating. Preferably, from about 15 to about 35 percent by weight is used to stabilize the amorphous alumina.

It has been found that a critical relationship exists between the rare earth metal:aluminum atom ratio and the degree of thermal stabilization imparted to the alumina coating of the support. Thus, it is preferred to express the amount of rare earth metal in terms of the atom ratio of rare earth metal to aluminum in the alumina coating. This atom ratio is 0.8–1.4 atoms of rare earth metal for each 8–20 atoms of aluminum. A most preferred ratio is about 1:10. It has been found that when the alumina contains rare earth metal and aluminum in this ratio it is extremely resistant to crystal phase change, even when heated to 950°C. for extended time periods. It has also been found that the support having the critical atom ratio retains this resistance to crystal phase change at high temperature even when it contains a catalytic metal as long as the amount of catalytic metal on an atom basis does not substantially exceed the amount of rare earth metal atoms.

Suitable support compositions can be prepared in a variety of ways. For the purpose of illustration, lanthanum will be used as the rare earth metal, although it is clear that both praseodymium and neodymium as well as the other rare earth metals can be used in the same manner. A suitable alumina coating may be prepared by codeposition of decomposable salts of aluminum and lanthanum. This is applied to the surface of an inert substrate such as an alumina, followed by evaporation and heating to decompose the salts to their oxides, forming a substantially amorphous alumina coating having lanthanum oxide uniformly distributed throughout the alumina coating.

According to another method the catalyst support may be made by a. applying a coating of a mixture of an alumina or a compound thermally decomposable to alumina and a rare earth metal oxide or material thermally decomposable to a rare earth metal oxide to the surface of an inert substrate, the atom ratio of said rare earth metal to aluminum in said coating being 1 rare earth metal atom to each 5.7–25 aluminum atoms, and b. drying said coating.

When the support is prepared in the above manner, the stabilized support exists as a lamina or coating of alumina on an inert substrate. The alumina coating contains a rare earth metal oxide, the atom ratio of rare earth metal to aluminum in the alumina coating being 1 to 5.7–25. Typical examples of inert substrates on which the lanthana-alumina can be deposited include all refractory materials such as zirconia, alumina-zirconia, calcium aluminate, alumina-titania, alumina, magnesia, alumina-magnesia, silica, silica-alumina, silica-magnesia, silicon carbide, zinc oxide, mullite, synthetic and natural zeolites, silica-zirconia, kaolin, silica-titania, magnesia-zirconia, magnesia-titania, zirconia titania, alumina-silica-magnesia, alumina-silica-zirconia, alumina-silica-titania, alumina-magnesia-zirconia, alumina-magnesia-titania, alumina-zirconia-titania, silica-magnesia-zirconia, silica-magnesia-titania, silica-zirconia-titania, magnesia-zirconia-titania, or mixtures of these support materials.

Of the foregoing refractories, the more preferred are alumina, monolithic aluminum silicate (e.g., mullite) and monolithic aluminum magnesium silicates. Also, such inert carriers as wire mesh, expanded metal, glass beads, marble chips, nails, metal turnings, metal screen, and the like, are very well suited since they extend the use of the support.

Commercially available aluminas upon which the rare earth containing alumina coating may be deposited include those sold by Aluminum Company of America "Desiccant Grade Active Aluminas; Grades F-1, F-3, and F-10," by the Kaiser Aluminum Company as "KA–101," and by Sumitomo Chemical Company as activated alumina "KHA, KHB, KHD, and experimental TY-1 and TY-3." Analysis and physical properties of typical aluminas used as inert substrates for the stabilized alumina coating and catalysts of this invention are:

| CHEMICAL ANALYSIS | |
|---|---|
| | Percent |
| $Al_2O_3$ | 85.0–98.7 |
| $Na_2O$ | 0.2–2.0 |
| $Fe_2O_3$ | 0.02–0.3 |
| $SiO_2$ | 0.02–5.0 |
| Loss on Ignition, 1100°C. | 1.0–7.0 |
| PHYSICAL PROPERTIES | |
| Surface area, $m^2/g$ | 75–360 |
| Form | granular or balls |
| Bulk density, $lb/ft^3$ | 43–57 |
| Specific gravity | 3.1–3.3 |
| Pore volume ml/g | 0.25–0.6 |

The following examples illustrate the preparation of the stabilized support materials of this invention.

EXAMPLE 1

To a mixing vessel is added 47 grams of lanthanum acetate and 400 grams of aluminum nitrate. The mixture is melted by heating. The molten salts are applied to an alumina containing 5 per cent $SiO_2$ by placing the alumina in the molten mixture and stirring until the alumina is coated. The coated alumina is then heated to 600°C. to convert the aluminum and lanthanum salts in the coating to their oxides. The uniform coating contains approximately 30 weight percent of lanthanum oxide uniformly distributed throughout the alumina.

Similar results can be obtained by substituting the lanthanum acetate with praseodymium acetate or neodymium acetate.

the prevention of high temperature crystallization in both the support and the catalyst itself. Although the table gives the data for copper, any metal-containing oxidation catalyst which tends to promote crystallization or the formation of metal aluminates can be stabilized by the method of this invention.

TABLE 1

Prevention of High Temperature Crystallization of Alumina Supports and Copper-Alumina Catalysts by Inclusion of Lanthanide Series Metals Uniformly Distributed in the Support or Catalyst

| | Composition | | | | X-Ray Diffraction Analysis | |
|---|---|---|---|---|---|---|
| | Atom Ratio | | Weight Per Cent | | | |
| Example No. | Cu/Al | Lanthanide Series Metal/Al | CuO | Lanthanide Series Metal Oxide | Prepared at 600°C | Heated to 900°C |
| 4  | 0     | 0             | 0    | 0            | Amorphous | Some crystalline $Al_2O_3$ |
| 5  | 0.035 | 0             | 5    | 0            | Amorphous | Strongly crystalline $Al_2O_3$ |
| 6  | 0.035 | $Pr_2O_3$-0.1 | 4    | $Pr_2O_3$-23 | Amorphous | Amorphous |
| 7  | 0.035 | $La_2O_3$-0.1 | 4    | $La_2O_3$-23 | Amorphous | Amorphous |
| 8  | 0.035 | $Nd_2O_3$-0.1 | 4    | $Nd_2O_3$-24 | Amorphous | Amorphous |
| 9  | 0     | $La_2O_3$-0.13| 0    | $La_2O_3$-30 | Amorphous | Amorphous |
| 10 | 0.09  | $La_2O_3$-0.13| 9    | $La_2O_3$-26.6 | Amorphous | Amorphous |
| 11 | 0.17  | $La_2O_3$-0.13| 15.8 | $La_2O_3$-24.6 | Amorphous | Some crystallinity |
| 12 | 0.35  | $La_2O_3$-0.13| 27.8 | $La_2O_3$-21.0 | Amorphous | Some crystallinity |
| 13 | 0.70  | $La_2O_3$-0.13| 43.0 | $La_2O_3$-16.5 | Amorphous | Crystalline $Al_2O_3$ and $CuAlO_4$ |

EXAMPLE 2

To a mixing vessel is added an aqueous solution containing 60 grams of lanthanum acetate and 400 grams of aluminum nitrate. The water is evaporated to produce a uniform solid mixture of lanthanum acetate and aluminum nitrate. The mixture was fused by melting and applied as a coating to the following inert substrates: wire mesh, monolithic mullite honeycomb, marble chips, silica granules, aluminum magnesium silicate monolithic honeycomb. Each is heated to 600°C. to decompose to the oxide. The final catalyst support (i.e., the coating) contains 34.3 weight percent lanthana.

A suitable catalyst can be prepared from the supports prepared in Examples 1 and 2 by impregnating the support with various amounts of copper nitrate in aqueous solution. The following example illustrates this procedure.

EXAMPLE 3

To the catalyst support material prepared in Example 1 is added an aqueous solution of copper nitrate. After soaking for approximately 2 hours the remainder of the solution is drained and the impregnated support is dried. On heating the catalyst to about 600°C., the copper nitrate is decomposed to copper oxide. The final catalyst can contain from 0.005 to about 15 weight percent copper oxide.

The effect of the rare earth metal oxide in preventing phase transformation of alumina under high temperatures is illustrated by comparing X-ray diffraction patterns of the catalyst support after preparation and after heating severely to 900°C. for 2 hours. Similarly, the effect of the lanthana in preventing the formation of crystalline-copper aluminates in copper-alumina catalysts is shown by comparison of X-ray diffraction patterns before and after heating to 900°C. Table 1 shows From the above, it can be seen that the rare earth metals act to prevent the formation of crystalline materials except at extremely high concentrations of metal oxide catalysts in solid solution. For example, in Examples 4 and 5, which don't contain any rare earth metal, both the support of Example 4 and the catalyst of Example 5 suffered crystal formation on heating to 900°C. In Examples 6-8, in which the atom ratio of rare earth metal to aluminum was 1:10, no crystal phase was observed on heating to 900°C. Similar results were observed at an atom ratio of 1:7.7. In Examples 11 to 13, with copper ranging from 15.8 to 43 percent, the amount of lanthana in the catalyst was insufficient to prevent formation of crystalline material and copper aluminates.

The foregoing has dealt mainly with the novel catalyst support of this invention. A further embodiment of the invention is a catalyst consisting essentially of an alumina matrix containing a catalytic metal and a rare earth metal oxide substantially uniformly distributed in the matrix. The critical atom ratio of the catalytic metal to rare earth metal to aluminum is 0.1–1 to 0.8–1.4 to 8–20.

More preferably, the atom ratio of catalytic metal to rare earth metal to aluminum is about 1:1:8–20, and most preferably 1:1:10.

One aspect of this catalyst embodies a catalyst in which the catalytic metal, usually in an oxide form, and rare earth metal are substantially uniformly distributed in an alumina matrix. Such a catalyst having the specified atom ratio is exceptionally resistant to thermal degradation. This type catalyst can be made by a method comprising:

a. mixing a catalytic metal compound, a rare earth metal compound and an alumina or aluminum compound thermally decomposable to an alumina in proportion such that the atom ratio of catalytic metal to rare earth metal to aluminum is 0.1–1:0-.8–1.4:8–20;

b. shaping the resultant mixture into catalyst forms;
c. drying the resultant catalyst; and
d. heating the dried catalyst to an activation temperature.

A wide variety of catalytic metal compounds can be employed. The preferred catalytic metal compounds are compounds of metals in Groups IB, VB, VIB, VIIB and VIII such as vanadium, niobium, tantalum, chromium, molybdenum, tungsten, manganese, rhenium, iron, ruthenium, osmium, cobalt, rhodium, iridium, nickel, palladium, platinum, copper, silver and gold. Also, metals such as barium and strontium can be included. Preferred metal compounds are those of the First Transitional Series and the noble metals such as platinum and palladium. Frequently, combinations of several metal compounds are used to supply the catalytic metal in the catalyst such as combinations of CuPd, CuV, CuCr, CuCrV, MnCu, CuNi, CuNiPd, MnPd, CuPt, CuCrPd, CuVPd, FeCo, CuFe, CuCo, CuCoPt, and the like. The catalytic metal compounds are generally oxides or compounds which are thermally decomposable to oxides such as hydroxides, carbonates, nitrates, acetates, sulfates, and the like. Examples are copper nitrate, copper sulfate, manganese nitrate, manganese acetate, iron hydroxide, manganese hydroxide, and the like. In the case of the noble metals which are generally used in quite small amounts the halides are acceptable, such as palladium chloride.

The useful aluminum compounds include alumina and compounds that are thermally decomposable to alumina such as crystalline alumina hydrate, aluminum hydroxide, alumina gel, aluminum nitrate, aluminum methylate, aluminum acetate, and the like. When alumina is used in the mixing operation it is beneficial to add sufficient nitric acid to the mixing operation to digest a portion of the alumina to form a paste into which the other ingredients are mixed.

The rare earth metal compounds used in the preparation of the catalysts include those previously listed which are the oxides or compounds thermally decomposable to form oxides such as nitrates and acetates.

The amount of each ingredient added to the mixture should be that which achieves the critical atom ratio of catalytic metal:rare earth metal:aluminum of 0.1–1:0-.8–1.4:8–20.

The mixture of catalytic metal compound, rare earth metal compound and aluminum compound can be formed into a catalyst shape by any of the methods well known in the catalyst industry. If it is in the form of a paste such as obtained by peptization with nitric acid the mixture is most readily extruded into extrudates one-sixteenth to one-fourth inches in diameter and cut into pieces one-eighth to one-half inches long. Dryer mixtures are readily compressed into pills or pellets. Following this, the catalyst is dried to remove excess water by heating in an oven at about 100°–150°C. and then activated by calcining at about 500°–700°C.

Small amounts of noble metal promoters, for example, from 0.001–0.1 weight percent, can be impregnated on the surface of the final catalyst to improve low temperature activity by use of an aqueous solution of a water-soluble salt of the noble metal such as palladium chloride.

The following example illustrates this method of making the catalyst.

EXAMPLE 14

In a mixing vessel place 79 parts of cupric oxide, 163 parts of lanthanum oxide and 510 parts (dry basis) of hydrated alumina. Mix thoroughly and add sufficient nitric acid to form a paste. Extrude the paste through a 1/16 inch die and cut into ¼ inch lengths. Dry at 100°C. for an hour and then heat to 600°C. over a 4-hour period. Hold at 600°C. for an hour and then cool. Immerse in an aqueous solution containing 1.1 part of palladium chloride until the total liquid is taken up. Dry again at 100°C. and heat to 600°C. over a 2-hour period and then cool.

The above example can be repeated using 71 parts of manganese oxide in place of the copper oxide to form a palladium-promoted manganese catalyst in a lanthana stabilized alumina matrix.

The following example illustrates another method of making the catalyst.

EXAMPLE 15

An aluminum hydroxide gel is prepared by placing 0.04 gram moles of praseodymium acetate in 1,500 ml of cold 0.75 gram molar aqueous aluminum sulfate. The resultant solution is added simultaneously with an equivalent solution of ammonium hydroxide containing 5 grams of copper acetate to 500 ml of stirred water maintained slightly alkaline. The precipitated aluminum hydroxide gel contains praseodymium and copper. The gel is washed, pelleted or extruded, air dried, and finally calcined at 600°C. to give a catalyst containing both copper and praseodymium uniformly distributed throughout an alumina matrix.

Using the above procedure, similar results can be obtained when the copper is substituted with decomposable compounds of vanadium, chromium, manganese, iron or with platinum or palladium or combinations of the foregoing. The above has described but a few methods of making the catalyst of this invention. Other methods are well known in the catalyst industry. Several methods are described in U.S. Pat. No. 3,428,573, incorporated herein by reference. These methods can be used by merely including the rare earth metal compound in the peptized mixture in the proper ratio.

Thus, it can readily be understood that according to the concentration and type of rare earth metal salt and metal-containing oxidation catalyst, a wide variety of catalysts are contemplated for stabilization by this invention. Typical are catalysts having the following compositions, all percentages are by weight:

15% copper oxide, 40% lanthana, 45% alumina
0.005% copper oxide, 1% lanthana, 98.995% alumina
4% copper oxide, 1% palladium, 15% lanthana, 80% alumina
10% copper oxide, 5% chromium oxide, 20% praseodymia, 65% alumina
15% manganese oxide, 35% neodymia, 50% alumina
10% iron oxide, 15% neodymia, 75% alumina
5% copper oxide, 2% vanadia, 0.1% palladium, 20% praseodymia, 72.9% alumina
14.4% copper oxide, 44.2% lanthana and 41.4% alumina on a KHA–24 alumina support
1% manganese oxide, 1% praseodymia and 98% lanthana on a KHA–46 alumina support
15% copper oxide, 34% lanthana and 51% alumina on a KA–101 alumina support Typical of catalysts which can be stabilized by the lanthanide series metal are those found in U.S. Pat. Nos. 3,170,758; 3,220,794; 3,224,981; 3,226,340; 3,227,659; 3,271,324; 3,380,810; 3,425,792; 3,428,573; 3,447,893; and 3,449,063, which are hereby incorporated by reference as if fully set forth.

Another method of making the catalyst comprises:
a. forming an aqueous solution of catalytic metal compound, rare earth metal compound and aluminum compound, which compounds are thermally decomposable to oxides, the atom ratio of catalytic metal to rare earth metal to aluminum in said solution being 0.1–1 to 0.8–1.4 to 8–20;
b. evaporating water from said solution whereby a solid mixture of said compounds is formed; and
c. heating said solid mixture to an activation temperature to form said catalyst.

The following example illustrates this method.

EXAMPLE 16

In a stirred vessel place 600 parts of aluminum nitrate, 50 parts of cupric nitrate and 69 parts of lanthanum nitrate. Add sufficient hot water to dissolve. After stirring, heat to drive off water until a thick paste forms. Spread the mixture about one-eighth inch thick in pans and continue drying in an oven at 100°–150°C. When dry, heat to 600°C. over a 4-hour period. Hold at 600°C. for 1 hour. Cool and break into small pieces for use as a catalyst.

The above example may be modified by extruding the paste to form extrudate instead of spreading it in pans. The extrudate is dried and calcined as above.

A broad range of atom ratios may be obtained following the above procedures by varying the amount of each ingredient so long as the ratios stay within the prescribed range of 0.1–1 gram atom of catalytic metal to 0.8–1.4 gram atoms of rare earth metal to 8–20 gram atoms of aluminum. An especially preferred ratio is about 1:1:8–20.

In another embodiment the aluminum matrix containing the rare earth metal and catalytic metal is applied as a coating to an inert substrate such as those previously disclosed as useful for preparing the novel substrates of this invention. The preferred inert supports are refractories such as alumina. Highly preferred refractories are honeycomb structured monolithic aluminum silicates such as mullite and honeycomb structured monolithic aluminum magnesium silicate.

These catalysts may be prepared by a method comprising:
a. forming an aqueous solution or slurry of a catalytic metal compound, a rare earth metal compound and an aluminum compound, which compounds are thermally decomposable to oxides, the atom ratio of catalytic metal to rare earth metal to aluminum in said solution or slurry being 0.1–1 to 0.8–1.4 to 8–20;
b. applying at least one coating of said solution or slurry to an inert substrate;
c. drying the resultant coated substrate; and
d. heating said coated substrate to an activation temperature.

According to one aspect of the above method, the catalysts are formed by immersing the inert substrate in an aqueous solution or sol containing the catalytic metal compound, rare earth metal compound and aluminum compound. After a short period, the coated substrate is removed and dried, following which it is calcined. Several immersions and drying operations may be employed to build up a heavier coating on the substrate. The solution used in this method contains the coating substituents in the required atom ratio. In other words, the amount of catalytic metal, rare earth metal and aluminum in the solution or sol is such that the atom ratio is 0.1–1 to 0.8–1.4 to 8–20.

The catalytic metal compound, rare earth metal compound and aluminum compound should be decomposable to an oxide form. Useful compounds are the nitrates, acetates, sulfates, and the like. A small amount of noble metal promoter, for example, 0.005–0.1 weight percent based on the finished catalyst, can be impregnated into the final coated catalyst to promote low temperature activity. This can be done using an aqueous solution of a noble metal salt such as palladium chloride.

The following example illustrates the above method of preparing a coated catalyst.

EXAMPLE 17

A solution was prepared containing 50 parts of cupric nitrate, 600 parts of aluminum nitrate and 69 parts of lanthanum nitrate dissolved in 700 parts of water. This gives a copper:lanthanum:aluminum atom ratio of 1:1:8. To one-half of this solution there was added 780 parts of transitional alumina (Alcoa F-1). The resultant alumina was dried and then heated to 600°C. for 1 hour. A second coating was applied by placing the coated alumina in the remaining one-half of the above solution, to which was also added 1.3 parts of palladium chloride. After absorption, it was again dried and heated to 600°C. as before, giving an alumina coated with the thermally decomposed salts of copper, lanthanum, aluminum and palladium.

EXAMPLE 18

An aqueous solution was prepared by mixing 25 grams of a mixture of rare earth nitrates (didymium nitrate, product of Trona, a division of American Potash and Chemical Corp., which analyzes as oxides as 45–46 weight percent lanthana, 32–33 weight percent neodymia, 9–10 weight percent praseodymia, 5–6 weight percent samaria, 3–4 weight percent gadolinia, 1–2 weight percent ceria), 2.36 grams of aluminum nitrate and sufficient water to make 200 ml of solution.

A second solution was prepared by mixing manganous nitrate with an equal amount of water.

A solution was prepared by mixing 5 ml of the first solution and 0.7 ml of the second solution. A 5-gram piece of a fibrous monolithic aluminum silicate ("Fibral–80," Societe Generale des Produits Refractaires) was immersed in the above solution until it absorbed the liquid. It was then dried and heated to 600°C. to decompose the nitrates to their oxides, forming an effective exhaust gas catalyst of this invention. (Low temperature activity of the above catalyst can be improved by adding sufficient palladium chloride to the impregnating solution to provide about 0.01 percent palladium in the calcined catalyst.)

From the above, it can be seen that in one aspect the invention can be defined as an inert substrate such as an alumina, zirconia, silica-alumina, magnesia, clay (e.g., mullite), aluminum magnesium silicate, and the like, impregnated one or more times with an aqueous solution of a catalytic metal compound, a rare earth metal compound and an aluminum compound, said compounds being thermally decomposable to oxides; the atom ratio of catalytic metal to rare earth metal to aluminum in the impregnating solution being 0.1–1 to 0.8–1.4 to 8–20. The impregnating solution can optionally contain a small amount of noble metal compounds such as rhodium, platinum or palladium, preferably palladium, to improve low temperature activity.

Another aspect of this invention is a method of oxidizing carbon monoxide and hydrocarbons contained in internal combustion engine exhaust gases by contacting the exhaust gases at elevated temperatures with a catalyst of this invention. The catalysts have been tested in the exhaust system of an Olds-type single cylinder engine, 9:1 compression ratio, with 36 cu. in. displacement using indolene with 12 milliliters of tetraethyl-lead as "Motor Mix." The catalysts used in the tests consisted of an alumina core coated with an alumina matrix containing copper and lanthana in the indicated atom ratios. A small amount (0.1%) of palladium was impregnated on the final catalyst. The catalysts were made following the general procedure of Example 17. The engine has a split exhaust leading to two 42 cu. in. catalyst containers having thermocouples attached before and after the catalyst bed. Catalyst bed temperature is usually around 870°C. The engine is operated for approximately 75 hours. Throughout the standard test a secondary air supply to provide oxygen for oxidation was introduced into the exhaust gas stream just prior to the catalyst bed. During the test the engine was continually cycled 50 seconds under idling conditions and 150 seconds under part throttle. The operating conditions for the test are as follows:

ENGINE OPERATING CONDITIONS

|  | Idle | Part Throttle |
|---|---|---|
| Engine speed, r.p.m. | 800 | 1340 |
| CO, % | 5.0 | 3.0 |
| Ignition timing, °btc | 10 | 10 |
| Added air, cfh | 100 | 100 |

In the "Oxidation-Reduction" modification of the above test the "added air" is stopped during the idle portion of the cycle. The exhaust emissions are measured every 24 hours during the test. After the test is terminated, the spent catalyst is checked for hardness or attrition resistance by shaking the catalyst in a commercial paint shaker for 1 hour and determining the weight loss as fines. This is reported in percent as attrition loss.

Using the above-described test, several catalysts prepared according to this invention were tested for activity and attrition resistance. The following table gives the results of these tests.

TABLE 2

| | Atom Ratio | | | Attrition | % Hydrocarbon Conversion | | End of Test Activation |
|---|---|---|---|---|---|---|---|
| No. | Cu | La | Al | Loss (%) | Start | End | Temp. °F. |
| 1. | 5 | 1 | 3.4 | 7.7 | 82 | 59 | 440 |
| 2. | 2 | 1 | 4 | 5.6 | 85 | 63 | 420 |
| 3. | 2 | 1 | 8 | 5.3 | 85 | 63 | 420 |
| 4. | 1 | 1 | 6 | 7.5 | 88 | 73 | 400 |
| 5. | 1 | 1 | 8 | 2.3 | 82 | 76 | 405 |

As the results show, Catalyst 1 which had 5 atoms of copper per atom of lanthanum in the alumina matrix coating suffered severe degradation during the attrition test. This is due to crystallization of the catalyst promoted by the copper. Catalyst 2 shows some improvement in attrition resistance but still contains excess copper for the lanthanum. Catalyst 3 shows a further improvement as the aluminum content of the matrix is increased into the critical range. Catalyst 4 has the preferred 1:1 atom ratio of copper to lanthanum but shows the detrimental effect of lowering the aluminum content of the matrix. Catalyst 5 is a catalyst of this invention and illustrates the sharp drop in attrition loss when all parameters fall within the critical range. Attrition loss in the test was only 2.3%. Hydrocarbon conversion remained high through the end of test and activation temperature remained low.

In addition to their use as exhaust gas catalyst supports, the lanthanide series metal oxide treated alumina materials may be used in any high temperature catalyst application or for insulators, shock absorbers, missile nose cones, and similar applications.

The foregoing description is illustrative of the invention and wide variations in catalyst composition and support composition as well as methods for their preparation can be envisioned by one skilled in the art. Thus, it is desired that the invention be limited only by the lawful scope of the following claims.

I claim:

1. A catalyst useful in treating exhaust gas of internal combustion engines, said catalyst consisting essentially of an alumina matrix containing a catalytic metal selected from the group consisting of the metals of Groups I-B, V-B, VI-B, VII-B and VIII of the Periodic Table in an oxide form and a rare earth metal oxide, the atom ratio of said catalytic metal to said rare earth metal to aluminum being 0.1–1 to 0.8–1.4 to 8–20, said catalytic metal oxide and rare earth metal oxide being substantially uniformly distributed throughout said alumina matrix.

2. A catalyst of claim 1 wherein said atom ratio of catalytic metal to rare earth metal to aluminum is about 1:1:8–20.

3. A catalyst of claim 2 wherein said rare earth metal oxide consists mainly of lanthanum oxide.

4. A catalyst of claim 1 wherein said catalytic metal is copper in an oxide form.

5. A catalyst of claim 1 wherein said catalytic metal is the combination of copper in an oxide form and palladium.

6. A catalyst of claim 5 wherein said rare earth metal oxide consists mainly of lanthanum oxide.

7. A catalyst of claim 5 wherein said rare earth metal oxide consists of praseodymium oxide.

8. A catalyst of claim 5 wherein said rare earth metal oxide consists of a mixture of rare earth metal oxides composed mainly of lanthanum oxide, praseodymium oxide and neodymium oxide.

9. A catalyst of claim 1 wherein said catalytic metal is manganese in an oxide form.

10. A catalyst of claim 1 wherein said catalytic metal is the combination of manganese in an oxide form and palladium.

11. A catalyst of claim 10 wherein said rare earth metal oxide is mainly lanthanum oxide.

12. A catalyst of claim 10 wherein said rare earth metal oxide is mainly praseodymium oxide.

13. A catalyst of claim 10 wherein said rare earth metal oxide consists of a mixture of rare earth metal oxides composed mainly of lanthanum oxide, praseodymium oxide and neodymium oxide.

14. A catalyst of claim 1 wherein said catalytic metal is vanadium in an oxide form.

15. A catalyst of claim 1 wherein said catalytic metal is a combination of copper and vanadium, both in an oxide form, and palladium.

16. A catalyst of claim 1 wherein said alumina matrix consists essentially of an alumina coating on the surface of a refractory selected from the group consisting of zirconia, alumina, magnesia, silica, and mixtures thereof, said alumina coating containing a catalytic metal selected from the group consisting of the metals of Groups I-B, V-B, VI-B, VII-B and VIII of the Periodic Table in an oxide form and a rare earth metal oxide substantially uniformly distributed in said matrix, the atom ratio of said catalytic metal to said rare earth metal to aluminum in said alumina coating being 0.1–1 to 0.8–1.4 to 8–20.

17. A catalyst of claim 16 wherein said atom ratio is about 1:1:8–20.

18. A catalyst of claim 16 wherein said refractory is a monolithic aluminum silicate.

19. A catalyst of claim 18 wherein said aluminum silicate is mullite.

20. A catalyst of claim 16 wherein said refractory is a monolithic aluminum magnesium silicate.

21. A catalyst of claim 16 wherein said refractory is an alumina.

22. A catalyst of claim 21 wherein said catalytic metal is copper in an oxide form.

23. A catalyst of claim 22 wherein said rare earth metal oxide consists mainly of lanthanum oxide.

24. A catalyst of claim 23 wherein said atom ratio is about 1:1:8–20.

25. A catalyst of claim 21 wherein said catalytic metal is the combination of copper in an oxide form and palladium.

26. A catalyst of claim 25 wherein said rare earth metal oxide consists mainly of lanthanum oxide.

27. A catalyst of claim 26 wherein said atom ratio is about 1:1:8–20.

28. A catalyst of claim 21 wherein said catalytic metal is manganese in an oxide form.

29. A catalyst of claim 28 wherein said rare earth metal oxide consists mainly of lanthanum oxide.

30. A catalyst of claim 29 wherein said atom ratio is about 1:1:8–20.

31. A catalyst of claim 21 wherein said catalytic metal is the combination of manganese in an oxide form and palladium.

32. A catalyst of claim 31 wherein said rare earth metal oxide consists mainly of lanthanum oxide.

33. A catalyst of claim 32 wherein said atom ratio is about 1:1:8–20.

34. A catalyst of claim 21 wherein said catalytic metal is vanadium in an oxide form.

35. A catalyst of claim 21 wherein said catalytic metal is the combination of vanadium and copper, both in an oxide form, and palladium.

36. A catalyst consisting essentially of an alumina carrier impregnated with an aqueous solution or slurry of an aluminum compound decomposable to alumina, a rare earth metal compound decomposable to an oxide and a catalytic metal compound, the atom ratio of catalytic metal to rare earth metal to aluminum in said solution or slurry being 0.1–1 to 0.8–1.4 to 8–20.

37. A catalyst of claim 26 wherein said alumina carrier contains 1–20 percent silica.

38. A catalyst of claim 37 wherein said aluminum compound is aluminum nitrate and said rare earth metal compound is a rare earth metal nitrate.

39. A catalyst of claim 38 wherein said catalytic metal compound is a copper compound decomposable to copper oxide.

40. A catalyst of claim 39 further characterized by being impregnated with a promoter amount of a palladium compound.

41. A catalyst of claim 38 wherein said catalytic metal compound is manganese compound decomposable to manganese oxide.

42. A catalyst of claim 41 further characterized by being impregnated with a promoter amount of a palladium compound.

* * * * *

UNITED STATES PATENT OFFICE
CERTIFICATE OF CORRECTION

PATENT NO. : 3,899,444
DATED : August 12, 1975
INVENTOR(S) : Ruth E. Stephens

It is certified that error appears in the above–identified patent and that said Letters Patent are hereby corrected as shown below:

Column 11, line 44, "substrates" should read -- supports --

Column 11, lines 44-45, "The preferred inert supports" should read -- The preferred inert substrates --

Column 16, Claim 37 should depend upon Claim 36

Column 16, Claim 41, insert "a" before "manganese compound"

Signed and Sealed this fourteenth Day of October 1975

[SEAL]

Attest:

RUTH C. MASON
*Attesting Officer*

C. MARSHALL DANN
*Commissioner of Patents and Trademarks*